(12) United States Patent
Kim et al.

(10) Patent No.: US 9,196,308 B2
(45) Date of Patent: Nov. 24, 2015

(54) CONTENT REPRODUCTION METHOD AND APPARATUS

(75) Inventors: Young-sun Kim, Suwon-si (KR); Ji-young Kwahk, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2725 days.

(21) Appl. No.: 11/703,101

(22) Filed: Feb. 7, 2007

(65) Prior Publication Data

US 2008/0080834 A1   Apr. 3, 2008

(30) Foreign Application Priority Data

Sep. 29, 2006  (KR) .................. 10-2006-0096286

(51) Int. Cl.
| | | |
|---|---|---|
| *G06F 17/30* | (2006.01) | |
| *G11B 27/10* | (2006.01) | |
| *G11B 27/30* | (2006.01) | |
| *H04N 5/84* | (2006.01) | |

(52) U.S. Cl.
CPC ........ *G11B 27/105* (2013.01); *G06F 17/30038* (2013.01); *G06F 17/30522* (2013.01); *G06F 17/30864* (2013.01); *G06F 17/30867* (2013.01); *G11B 27/3027* (2013.01); *H04N 5/84* (2013.01)

(58) Field of Classification Search
CPC .................. G06F 17/30867; G06F 17/30038; G06F 17/30522; G06F 17/30864; G11B 27/105; G11B 27/3027
USPC .................................. 707/722, 724, 999.003
See application file for complete search history.

(56) References Cited

U.S. PATENT DOCUMENTS

| | | | |
|---|---|---|---|
| 6,567,104 B1* | 5/2003 | Andrew et al. ............... | 715/762 |
| 6,892,226 B1* | 5/2005 | Tso et al. ...................... | 709/218 |
| 7,386,555 B2* | 6/2008 | Vilcauskas et al. ................ | 1/1 |
| 2002/0118949 A1* | 8/2002 | Jones et al. ..................... | 386/68 |
| 2003/0125876 A1* | 7/2003 | Root et al. ......................... | 702/3 |
| 2005/0160167 A1* | 7/2005 | Cheng et al. ................. | 709/224 |
| 2007/0064121 A1* | 3/2007 | Issa et al. ................... | 348/231.2 |

FOREIGN PATENT DOCUMENTS

| | | |
|---|---|---|
| CN | 144380 A | 3/1997 |
| JP | 10-143978 A | 5/1998 |
| KR | 1020040064955 A | 7/2004 |
| KR | 10-2004-0073012 A | 8/2004 |
| KR | 10-2005-0119314 A | 12/2005 |
| KR | 10-2006-0025850 A | 3/2006 |
| WO | 2005-079172 A2 | 9/2005 |

OTHER PUBLICATIONS

Communication issued on Feb. 16, 2012 by the Intellectual Property Office of the P.R. of China in the counterpart Chinese Patent Application No. 200710091911.

(Continued)

*Primary Examiner* — Shiow-Jy Fan
(74) *Attorney, Agent, or Firm* — Sughrue Mion, PLLC (57) ABSTRACT

Provided are a content reproduction method and apparatus. The content reproduction method includes receiving a select signal for selecting one or more pieces of content; and reproducing the selected pieces of content and one or more pieces of content which were generated or reproduced together with the selected pieces of content in a temporal space within a range.

26 Claims, 6 Drawing Sheets

(56) References Cited

OTHER PUBLICATIONS

Communication, dated Feb. 27, 2008, issued by the Korean Intellectual Property Office in corresponding Korean Application No. 10-2006-0096286.

Communication, dated Sep. 28, 2012, issued by the State Intellectual Property office of the P.R.C. in counterpart Chinese Application No. 200710091911.

* cited by examiner

| CONTENT SELECTED BY USER | FOUND CONTENT | COMBINATION POSSIBILITY |
|---|---|---|
| MOVING IMAGE | MOVING IMAGE | LOW |
| MOVING IMAGE | MUSIC | LOW |
| MOVING IMAGE | PICTURE | AVERAGE |
| MOVING IMAGE | TEXT | AVERAGE |
| MUSIC | MOVING IMAGE | LOW |
| MUSIC | MUSIC | LOW |
| MUSIC | PICTURE | HIGH |
| MUSIC | TEXT | HIGH |
| PICTURE | MOVING IMAGE | AVERAGE |
| PICTURE | MUSIC | HIGH |
| PICTURE | PICTURE | AVERAGE |
| PICTURE | TEXT | AVERAGE |
| TEXT | MOVING IMAGE | AVERAGE |
| TEXT | MUSIC | HIGH |
| TEXT | PICTURE | AVERAGE |
| TEXT | TEXT | AVERAGE |

CONTENT REPRODUCTION METHOD AND APPARATUS

This application claims priority from Korean Patent Application No. 10-2006-0096286, filed on Sep. 29, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to content reproduction, and more particularly, to simultaneously reproducing a plurality of pieces of content in association with each other.

2. Description of the Related Art

Related art content reproduction systems include compact disc (CD) players, digital versatile disc (DVD) players, Moving Picture Experts Group-1 audio layer 3 (MP3) players, portable multimedia players (PMPs), computer systems, and cellular phones. These content reproduction systems reproduce content stored on media such as CDs, DVDs, hard disc drivers (HDDs), and memories. Hence, the content reproduction systems are also called media players. Content that can be reproduced by the media players may include music files, picture files, text files, and moving-image files.

The content reproduction systems can also generate new content. For example, the content reproduction systems can photograph pictures or moving images, input text, and record music.

Also, the content reproduction systems can simultaneously reproduce two or more pieces of content. In order to reproduce content, a user has to select the content. In particular, in order to simultaneously reproduce two or more pieces of content, such as when the user desires to view a picture while listening to music, the user must select all pieces of content that are to be reproduced. If the user desires to simultaneously reproduce two or more pieces of content without selecting them, the user or designer must preset the two or more pieces of content in the content reproduction systems.

When a user desires to simultaneously enjoy two or more pieces of content, if the user has to select all of them, it is quite cumbersome on the user. For example, if the user desires to simultaneously listen to music and view a picture, the user has to select the music and then search for a desired picture, which may be cumbersome.

In addition, if a user or a designer presets the relationship between content that is to be simultaneously reproduced, it is impossible to respond to changes in the user's taste.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a content reproduction method and apparatus which enable a user to simultaneously enjoy a plurality of pieces of content by selecting only one of the pieces of content.

The present invention also provides a content reproduction method and apparatus which can sense a pattern in which a user enjoys content and automatically respond to the pattern, thereby increasing the satisfaction of the user.

According to an aspect of the present invention, there is provided a content reproduction method including receiving a select signal for reproducing one or more of a plurality of pieces of content; and reproducing one or more pieces of content selected in response to the select signal, and one or more pieces of content which were generated or reproduced together with the selected pieces of content in a temporal space within a predetermined range.

The temporal space within the predetermined range may denote at least one of date, time, and location of generation or reproduction, in terms of which the selected pieces of content match the pieces of content which were generated or reproduced together with the selected pieces of content.

The method may further include generating or reproducing a plurality of pieces of content; and recording information regarding the generated or reproduced pieces of content, wherein the information includes spatio-temporal information about a time and a space in which the pieces of content were generated or reproduced.

The spatio-temporal information may include information regarding date, time, and location.

The method may further include generating or reproducing a plurality of pieces of content; and recording information regarding the generated or reproduced pieces of content, wherein the information comprises index information of the pieces of content which were generated or reproduced.

The spatio-temporal information may be meta information of the pieces of content.

The reproducing of the pieces of content may include searching for one or more pieces of content having spatio-temporal meta information within a range from the selected pieces of content; and reproducing the selected pieces of content together with found pieces of content.

The reproducing of the pieces of content may include searching for one or more pieces of content having spatio-temporal meta information within a range from that of the selected pieces of content; determining whether there is interference between the selected pieces of content and the found pieces of content; and reproducing the selected pieces of content together with found pieces of content if it is determined that there is no interference between the selected pieces of content and the found pieces of content.

The selected pieces of content may include music content, and the found pieces of content may include picture content. If there is more than one found piece of content, the pieces of content may be sequentially reproduced in a slide show.

The selected pieces of content may include music content, and the found pieces of content may include text content. If there is more than one found piece of content, the pieces of content may be sequentially reproduced in a slide show.

The selected pieces of content may include picture content, and the found pieces of content may include music content. If there is more than one found piece of content, the pieces of content may be sequentially reproduced.

The selected pieces of content may include text content, and the found pieces of content may include music content. If there is more than one found piece of content, the pieces of content may be sequentially reproduced.

According to another aspect of the present invention, there is provided a content reproduction apparatus including a storage unit which stores a plurality of pieces of content; a control unit which receives a select signal for reproducing one or more of the stored pieces of content, and reproduces one or more pieces of content selected in response to the select signal and one or more pieces of content which were generated or reproduced together with the selected pieces of content in a temporal space within a range.

The temporal space may denote at least one of the date, time, and location of generation or reproduction, in terms of which the selected pieces of content match the pieces of content which were generated or reproduced together with the selected pieces of content.

The storage unit may store information regarding the pieces of content, the information comprising spatio-temporal information about a time and a space in which the pieces of content were generated or reproduced, and the control unit may reproduce the pieces of content based on the information.

The spatio-temporal information may include information regarding date, time, and location.

The storage unit may store information regarding the pieces of content, the information including index information of the pieces of content which were generated or reproduced, and the control unit may reproduce the pieces of content based on the information.

The spatio-temporal information may be meta information of the pieces of content.

The control unit may receive a select signal for reproducing one or more of the stored pieces of content, search for one or more pieces of content having spatio-temporal meta information within a range from the selected pieces of content, and reproduce the selected pieces of content together with the found pieces of content.

The control unit may receive a select signal for reproducing one or more of the stored pieces of content, search for one or more pieces of content having spatio-temporal meta information within a range from the selected pieces of content, determine whether there is interference between the selected pieces of content and found pieces of content, and reproduce the selected pieces of content together with the found pieces of content if it is determined that there is no interference between the selected pieces of content and the found pieces of content.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms, and should not be construed as being limited to the exemplary embodiments set forth therein; rather, these exemplary embodiments are provided so that this disclosure will be thorough and complete, and will fully convey the concept of the invention to those skilled in the art.

Figure 1:
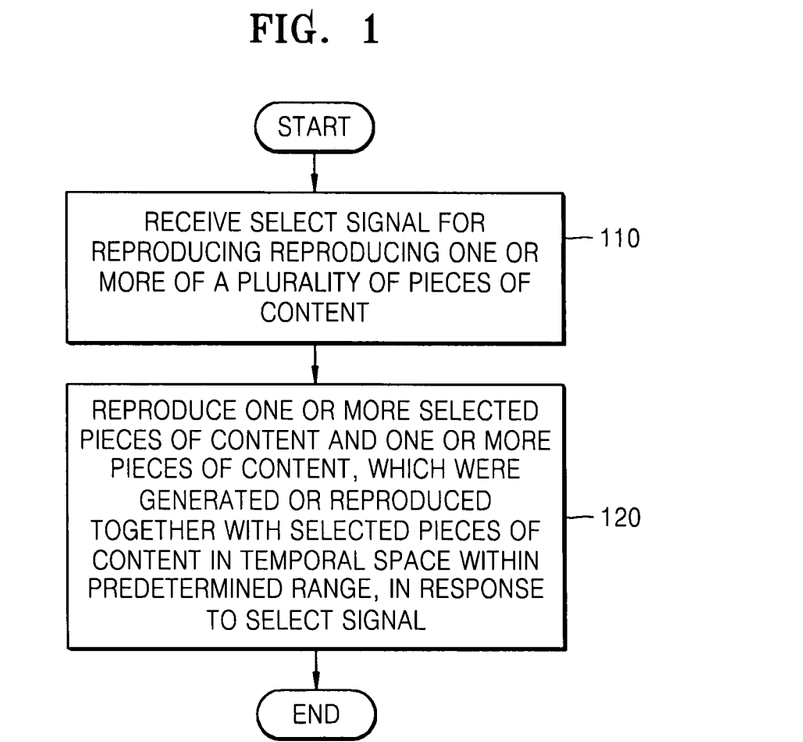
FIG. 1 is a flowchart illustrating a content reproduction method according to an exemplary embodiment of the present invention.

FIG. 1 is a flowchart illustrating a content reproduction method according to an exemplary embodiment of the present invention.

Referring to FIG. 1, in operation 110, a select signal for reproducing one or more of a plurality of pieces of content is input. A user selects one or more pieces of content that are to be reproduced from a plurality of pieces of content stored in a content reproduction apparatus, and inputs a select signal for reproducing the selected pieces of content.

In operation 120, the selected pieces of content and one or more pieces of content, which were generated or reproduced together with the selected pieces of content in a temporal space within a predetermined range, are reproduced together, based on the select signal input from the user. The temporal space is at least one of date, time, and location of generation or reproduction, in terms of which the pieces of content generated together with the selected pieces of content match the selected pieces of content.

For example, when a user listens to music A content and reads text B content simultaneously, information regarding the music A content and the text B content is stored in the content reproduction apparatus. If the user inputs a select signal for reproducing the music A content or the text B content stored in the content reproduction apparatus in operation 110, the music A content and the text B content are reproduced together in response to the select signal in operation 120.

In an exemplary embodiment of the present invention, information regarding a plurality of pieces of content that are to be reproduced together may include spatio-temporal information about a time and a space in which the pieces of content were generated or reproduced. Once a select signal for reproducing content is input, content having spatio-temporal information within a predetermined range from the selected content is searched for. Then, the selected content and the found content are reproduced together.

In another exemplary embodiment of the present invention, information regarding a plurality of pieces of content that are to be reproduced together may include index information of the pieces of content that were generated in a temporal space within a predetermined range. The pieces of content that are to be reproduced together are grouped, and information regarding such grouping is stored in the content reproduction apparatus. Therefore, once a user inputs a select signal for reproducing content, selected content and the other content included in the same group as selected content can be reproduced together, based on the index information of the selected content.

Figure 2:
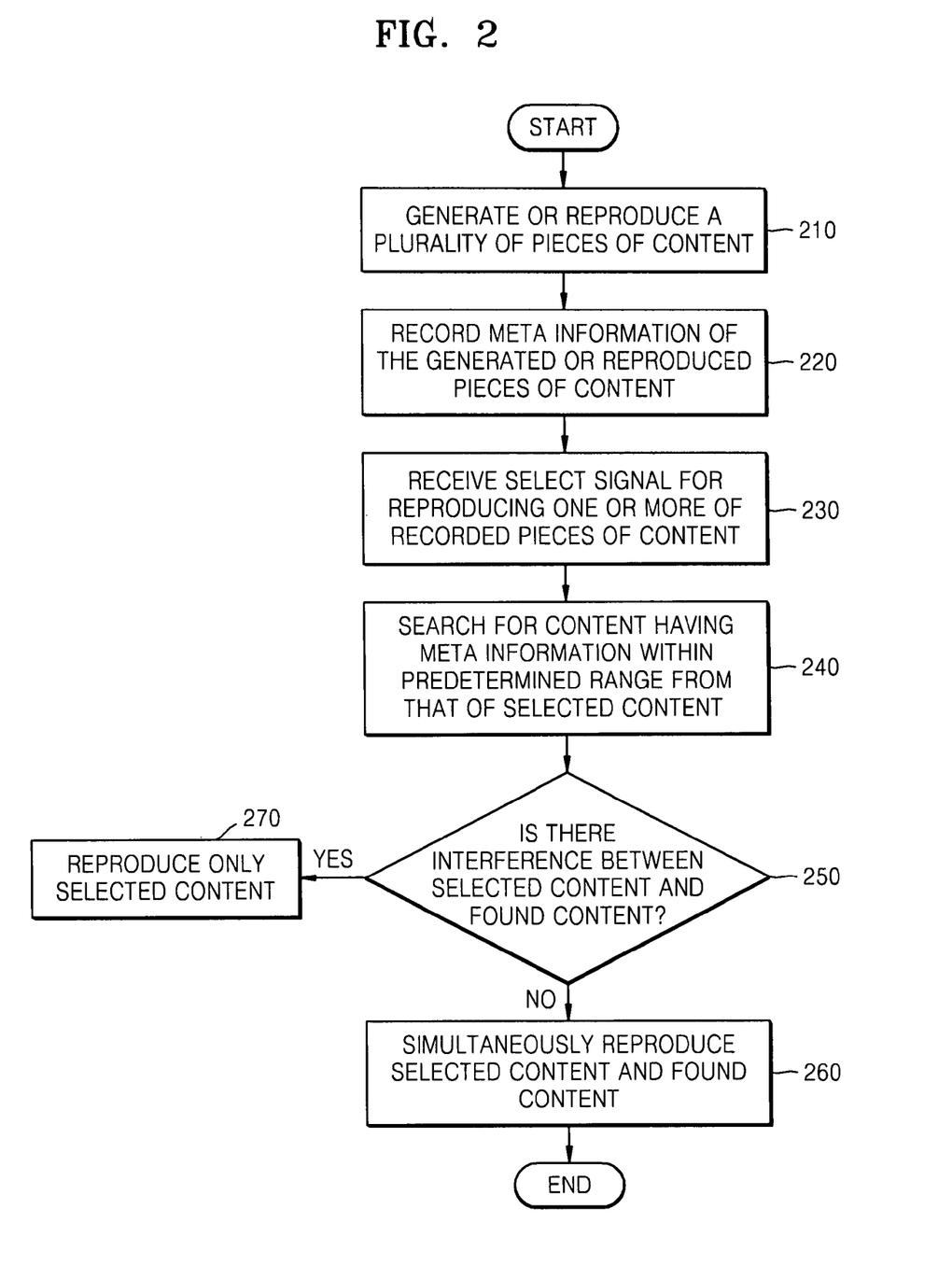
FIG. 2 is a flowchart illustrating a content reproduction method according to an exemplary embodiment of the present invention.

FIG. 2 is a flowchart illustrating a content reproduction method according to an exemplary embodiment of the present invention.

Referring to FIG. 2, in operation 210, a plurality of pieces of content are generated or reproduced. A user may generate or reproduce the pieces of content using a media player which can provide both an audio function and a display function. The temporal spaces in which the pieces of content were generated or reproduced must match one another. In other words, at least one of the date, time, and location in which the pieces of content were generated or reproduced must be the same. For example, an apparatus having a reproduction function can play music and display a stored picture simultaneously. On the other hand, an apparatus having a content generation function, such as a camera function, an audio recording function, and/or a video recording function, can play music and take a photograph simultaneously, or record music and display a picture simultaneously.

In operation 220, meta information of the generated or reproduced pieces of content is recorded. Meta information denotes information about data and knowledge related to content. The meta information that is to be recorded may include content type, content name, time at which the content was generated or recorded, duration of the content, volume of the content, and information regarding a space in which the content was generated or recorded. The information regarding the space in which the content was generated or reproduced and the duration of the content may be recorded using a global positioning system (GPS). The time at which the content was generated or reproduced and the duration of the content are recorded in the content reproduction apparatus as soon as the content is generated or reproduced. Spatio-temporal meta information denotes temporal and spatial information included in the meta information.

In operation 230, a select signal for reproducing one or more of the recorded pieces of content is input by a user. Specifically, the user selects content desired for reproduction from the pieces of content having the meta information recorded through a user interface unit. All or part of the meta information of the pieces of content may be displayed for the user, such as the title of the content.

In operation 240, one or more pieces of content having meta information within a predetermined range from the pieces of content selected by the user are searched for. Content reproduced or generated in a space or at a time within a predetermined range may be searched for, and may be preset by the user or a designer.

In operation 250, it is determined whether there is interference between the pieces of content selected by the user and the found pieces of content. Interference between content occurs when it is difficult to simultaneously reproduce two or more pieces of content, due to a low possibility of combination. For example, if both the selected pieces of content and the found pieces of content are music content, it is difficult to simultaneously reproduce them. On the other hand, if the selected pieces of content and the found pieces of content are music content and picture content, respectively, no interference occurs between them, due to a high possibility of combination. The possibility of content combination will be described in detail later with reference to FIG. 3.

In operation 260, if it is determined that there is no interference between the selected pieces of content and the found pieces of content in operation 250, they are simultaneously reproduced. If there is more than one found piece of content, the found pieces of content may be sequentially reproduced, while the selected pieces of content are reproduced. For example, if the found pieces of content are picture content or text content, they may be sequentially displayed in a slide show. If the found pieces of content are music content, they may also be sequentially reproduced. In this case, the found pieces of content may be reproduced in various orders, such as in order from highest relevance to lowest relevance, or in order from the latest piece of content to the oldest piece of content. Alternatively, the user or the designer may preset the reproduction order. If the selected pieces of content are music or moving-image content and the found pieces of content are picture content or text content, the found pieces of content can be displayed not only sequentially, but also simultaneously on one screen.

In operation 270, if it is determined that there is interference between the selected pieces of content and the found pieces of content in operation 250, only the pieces of content selected by the user are reproduced. For example, if the selected pieces of content are moving-image content and the found pieces of content are music content, it is difficult to simultaneously reproduce them. Hence, only the selected pieces of content are reproduced. The existence of interference may be determined by the content type included in the recorded meta information.

Figure 3:
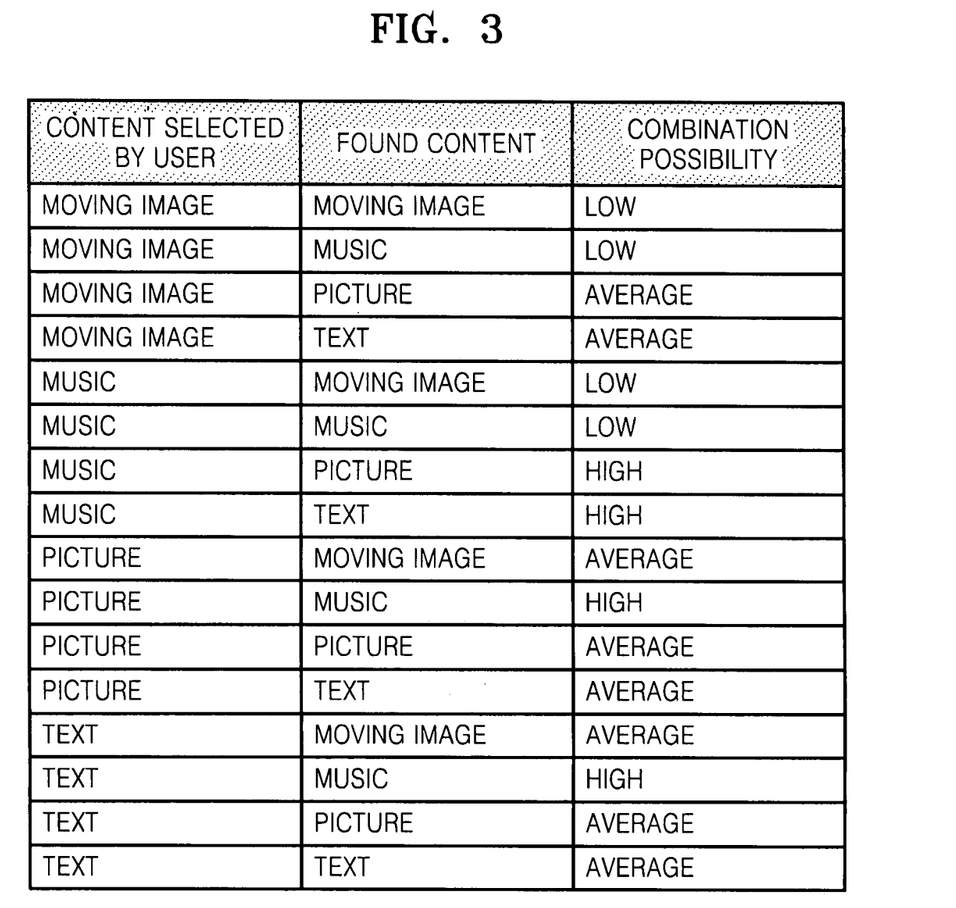
FIG. 3 is a table showing possibilities of content combination.

FIG. 3 is a table showing possibilities of content combination. The possibility of content combination indicates how likely a plurality of pieces of content are to be reproduced simultaneously.

Referring to the table, since music content and picture content or music content and text content can be simultaneously reproduced, they have a high possibility of combination. For moving-image content and picture content, moving-image content and text content, or picture content and text content, the possibility of combination is average. In order to simultaneously reproduce a plurality of these pieces of content, a screen must be divided, so that the pieces of content can be displayed on the divided screen. For example, the selected content may be displayed on the left of the screen, and the found content may be displayed on the right of the screen. In addition, the selected content may be displayed larger than the found content. Since moving-image content and music content cannot be simultaneously reproduced, they have a low possibility of combination.

A user or a designer may set the combination possibility to "high" for a case in which two or more pieces of content can be reproduced without interfering with each other. Alternatively, the user or designer may set an average or higher possibility of combination to be a case of no interference.

Figure 4:
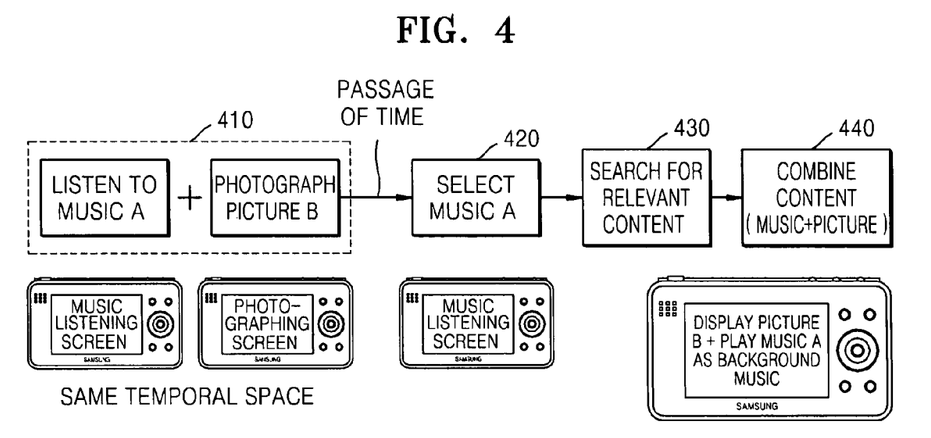
FIG. 4 is a diagram illustrating a content reproduction method according to an exemplary embodiment of the present invention.

FIG. 4 is a diagram illustrating a content reproduction method according to an exemplary embodiment of the present invention.

Referring to FIG. 4, in operation 410, a user listens to music A and photographs a picture B in the same temporal space. When the user starts to listen to music A, a screen for listening to music, hereinafter referred to as a music listening screen, is displayed on a screen of a content reproduction apparatus. Then, if the user intends to photograph picture B while listening to music A, a screen for photographing a picture, hereinafter referred to as a photographing screen, is displayed.

In operation 420, after a period of time, if the user desires to listen to music A, the user searches for music A on the screen of the content reproduction apparatus. Then the music listening screen is displayed.

In operation 430, the content reproduction apparatus searches for relevant content having spatio-temporal meta information within a predetermined range from music A, combines found content with music A, and simultaneously reproduces the combined content. Music A and picture B are contents which were generated or reproduced in a temporal space within a predetermined range, and have the spatio-temporal meta information within the predetermined range.

In operation 440, music A and picture B are simultaneously reproduced as combined content. Since the picture content and the music content have a high possibility of combination according to the table of FIG. 2, they can be simultaneously reproduced without interfering with each other. Picture B can be displayed while music A is played as background music.

Figure 5:
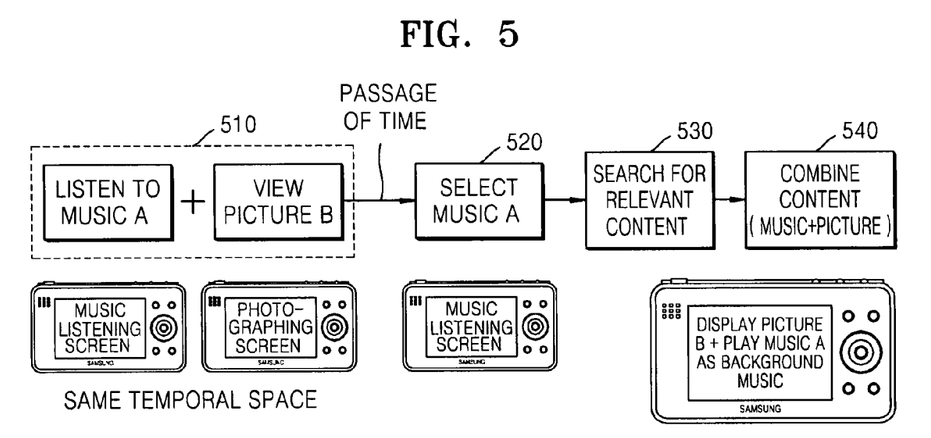
FIG. 5 is a diagram illustrating a content reproduction method according to an exemplary embodiment of the present invention.

FIG. 5 is a diagram illustrating a content reproduction method according to an exemplary embodiment of the present invention.

Referring to FIG. 5, in operation 510, when a user starts to listen to music A, a music listening screen is displayed. While listening to music A, the user displays a screen for viewing a picture, hereinafter referred to as a picture viewing screen, and views a picture B. After a period of time, if the user selects music A in a content reproduction apparatus in operation 520, the music listening screen for music A is displayed. In operation 530, relevant content having spatio-temporal meta information within a predetermined range is searched for. In operation 540, music A and picture B are combined and reproduced simultaneously. Picture B is displayed while music A is played as background music.

Figure 6:
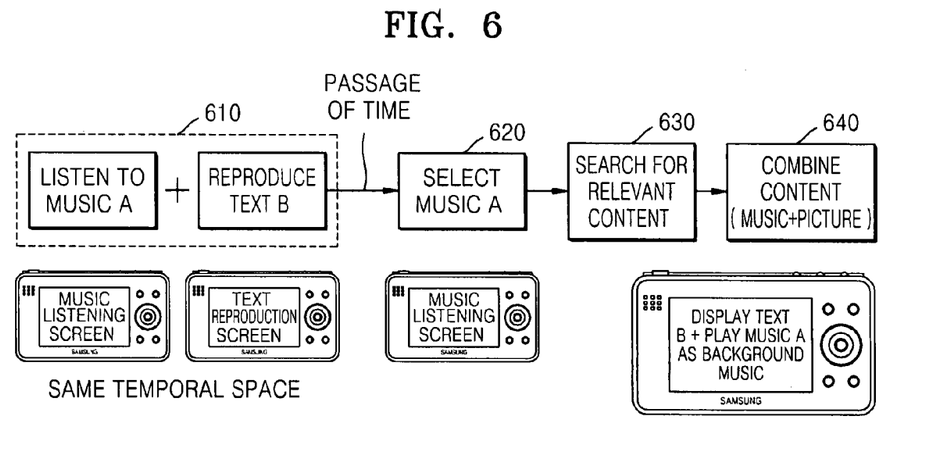
FIG. 6 is a diagram illustrating a content reproduction method according to an exemplary embodiment of the present invention.

FIG. 6 is a diagram illustrating a content reproduction method according to an exemplary embodiment of the present invention.

Referring to FIG. 6, in operation 610, when a user starts to listen to music A, a music listening screen is displayed. While listening to music A, the user displays a screen for viewing text, hereinafter referred to as a text reproduction screen, and views text B. After a period of time, if the user selects music A in a content reproduction apparatus in operation 620, the music listening screen for music A is displayed. In operation 630, relevant content having spatio-temporal meta information within a predetermined range is searched for. In operation 640, music A and picture B are combined and reproduced simultaneously. Picture B is displayed while music A is played as background music.

Figure 7:
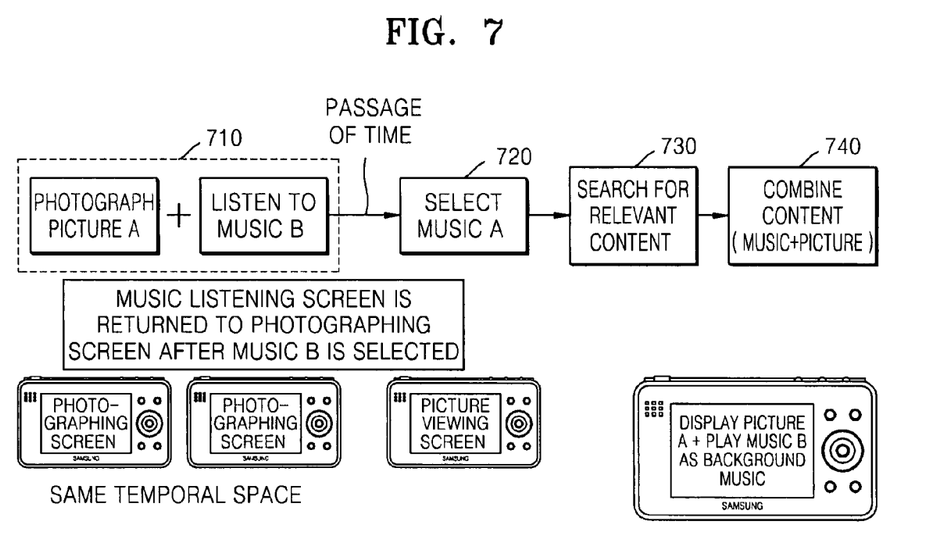
FIG. 7 is a diagram illustrating a content reproduction method according to an exemplary embodiment of the present invention.

FIG. 7 is a diagram illustrating a content reproduction method according to an exemplary embodiment of the present invention.

Referring to FIG. 7, in operation 710, a user photographs a picture A through a photographing screen. Then the user displays a music listening screen, selects music B on the music listening screen, and listens to music B while photographing picture A. After the user selects music B, the music listening screen is changed to the photographing screen. After a period of time, if the user selects picture A in a content reproduction apparatus in operation 720, a picture viewing screen is displayed. In operation 730, relevant content having spatio-temporal meta information within a predetermined range is searched for. In operation 740, picture A and music B are combined and reproduced simultaneously. Picture A is displayed at the same as when music B is played as background music.

Figure 8:
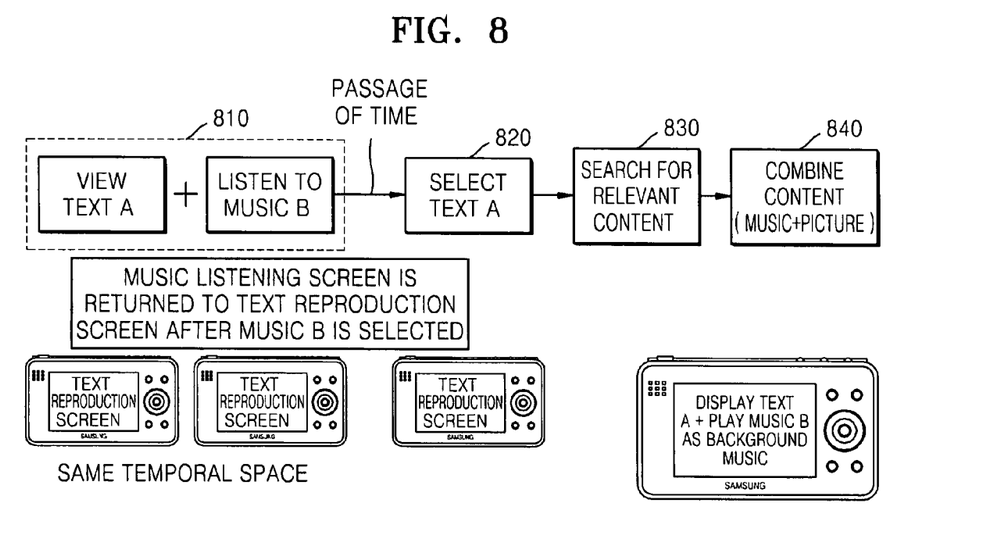
FIG. 8 is a diagram illustrating a content reproduction method according to an exemplary embodiment of the present invention.

FIG. 8 is a diagram illustrating a content reproduction method according to an exemplary embodiment of the present invention.

Referring to FIG. 8, in operation 810, a user views text A on a text reproduction screen. Then the user displays a music listening screen, selects music B on the music listening screen, and listens to music B while viewing text A. After the user selects music B, the music listening screen is changed to the text reproduction screen. After a period of time, if the user selects text A in a content reproduction apparatus in operation 820, the text reproduction screen is displayed. In operation 830, relevant content having spatio-temporal meta information within a predetermined range is searched for. In operation 840, text A and music B are combined and reproduced simultaneously. Text A is displayed while music B is played as background music.

Figure 9:
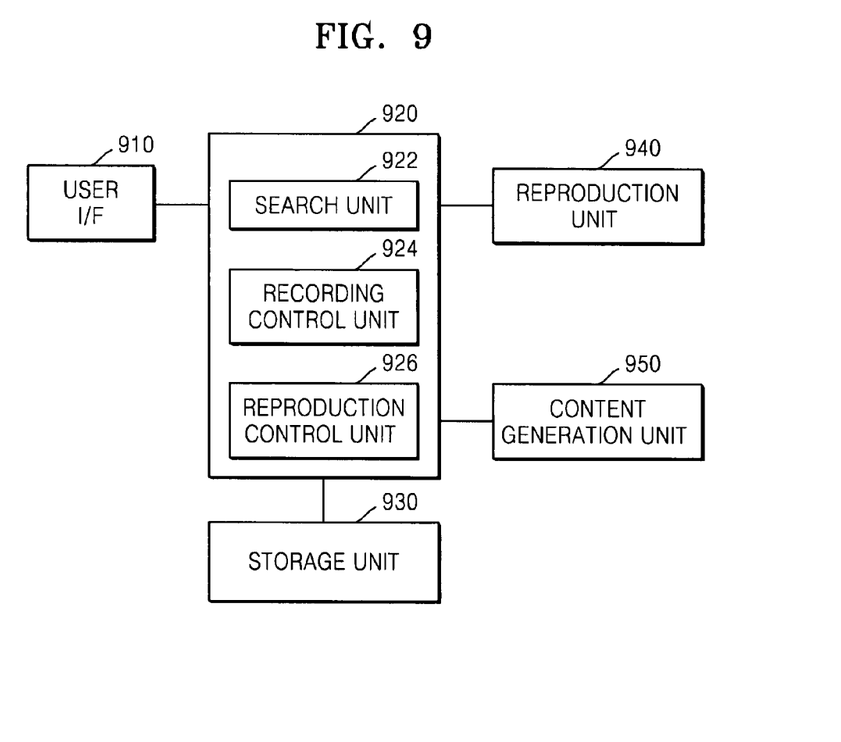
FIG. 9 is a block diagram of a content reproduction apparatus according to an exemplary embodiment of the present invention.

FIG. 9 is a block diagram of a content reproduction apparatus according to an exemplary embodiment of the present invention.

Referring to FIG. 9, the content reproduction apparatus includes a user interface unit 910, a control unit 920, a storage unit 930, a reproduction unit 940, and a content generation unit 950.

The user interface unit 910 enables a user to access the content reproduction apparatus and control the content reproduction apparatus, to operate the content reproduction apparatus according to the user's instructions. The user may input a select signal for reproducing content, and instruct the content reproduction apparatus to generate content through the user interface unit 910.

The control unit 920 includes a search unit 922, a recording control unit 924, and a reproduction control unit 926. The reproduction unit 940 reproduces content selected by the user in a temporal space within a predetermined range. Alternatively, the content generation unit 950 generates a plurality of pieces of content. The temporal space within the predetermined range denotes at least one of the date, time, and location of generation or reproduction, in terms of which a plurality of pieces of content match each other.

The recording control unit 924 of the control unit 920 recognizes generated or reproduced content, and records meta information of the generated or reproduced content in the storage unit 930. The meta information that is to be recorded in the storage unit 930 includes content type, content name, time at which the content was generated or recorded, duration of the content, volume of the content, and information regarding a space in which the content was generated or recorded. The information regarding the space in which the content was generated or reproduced may be recorded using a GPS. The time at which content was generated or reproduced and the duration of the content are recognized by the control unit 920, and recorded in the storage unit 930 as soon as the content is generated or reproduced.

After a period of time, if the user inputs a select signal for reproducing any one of pieces of content recorded in the storage unit 930 through the user interface unit 910, the search unit 922 of the control unit 920 searches for content having spatio-temporal meta information within a predetermined range from the selected content. Then the reproduction control unit 926 of the control unit 920 determines whether there is interference between the content selected by the user and the found content. If there is interference between content, it is difficult to simultaneously reproduce two or more pieces of content. As described above with reference to FIG. 2, the existence of interference between content may be preset by the user or a designer, according to a combination possibility of each content type.

If there is no interference between the selected content and the found content, the reproduction unit 940 simultaneously reproduces the selected content and the found content. If there is interference between the selected content and the found content, the reproduction unit 940 reproduces the content selected by the user.

As described above, according to exemplary embodiments of the present invention, a user can simultaneously enjoy two or more pieces of relevant content by selecting only one of them. When content is provided, another content which was generated or reproduced together with the content in the same temporal space is automatically provided. Therefore, the user can simultaneously enjoy the two pieces of content.

In addition, since the present invention reminds the user of memories, the user's satisfaction with the product can be increased.

The exemplary embodiments of the present invention can be written as computer programs, and can be implemented in general-use digital computers that execute the programs using a computer readable recording medium. Examples of the computer readable recording medium include magnetic storage media, such as ROM, floppy disks, and hard disks; optical recording media, such as CD-ROMs and DVDs; and other storage media.

While the present invention has been particularly shown and described with reference to exemplary embodiments thereof, it will be understood by those of ordinary skill in the art that various changes in form and details may be made therein without departing from the spirit and scope of the present invention as defined by the following claims and their legal equivalents. The exemplary embodiments should be considered only in a descriptive sense, and not for purposes of limitation. Therefore, the scope of the invention is defined not by the detailed description of the invention but by the appended claims and their legal equivalents, and all differences within the scope will be construed as being included in the present invention.

What is claimed is:

1. A content reproduction method comprising:
    storing, in a storage unit, a plurality of contents and a plurality of spatio-temporal meta information which correspond to the plurality of contents;
    receiving a selection signal for selecting one or more first contents among the plurality of contents to be reproduced;
    searching the plurality of contents stored on the storage unit for one or more second contents having spatio-temporal meta information that is within a range of spatio-temporal meta information of the selected one or more first contents; and
    reproducing the selected one or more first contents together with the one or more second contents found during the searching,
    wherein spatio-temporal meta information of a corresponding content is information about a time and a location at which the corresponding content was generated or reproduced.

2. The method of claim 1, wherein the spatio-temporal meta information comprises information regarding date, time, and location.

3. The method of claim 1, further comprising, after finding the one or more second contents through the searching:
    determining whether there is interference between the selected one or more first contents and the found one or more second contents; and
    reproducing the selected one or more first contents together with the found one or more second contents if it is determined that there is no interference between the selected one or more first contents and the found one or more second contents.

4. The method of claim 1, wherein the selected one or more first contents comprise music content, and the found one or more second contents comprise picture content.

5. The method of claim 4, wherein if two or more contents are found during the searching, the found two or more contents are sequentially reproduced in a slide show.

6. The method of claim 1, wherein the selected one or more first contents comprise music content, and the found one or more second contents comprise text content.

7. The method of claim 6, wherein if two or more contents are found during the searching, the found two or more contents are sequentially reproduced in a slide show.

8. The method of claim 1, wherein the selected one or more first contents comprise picture content, and the found one or more second contents comprise music content.

9. The method of claim 8, wherein if two or more contents are found during the searching, the found two or more contents are sequentially reproduced.

10. The method of claim 1, wherein the selected one or more first contents comprise text content, and the found one or more second contents comprise music content.

11. The method of claim 10, wherein if two or more contents are found during the searching, the found two or more contents are sequentially reproduced.

12. The method of claim 1, wherein the location is recorded as part of the spatio-temporal meta information using a global positioning system.

13. The method of claim 1, wherein, the searching the plurality of contents comprises searching for one or more second contents that was generated or reproduced at a time that is within a range of another time that the one or more first contents was generated or reproduced at based on the plurality of spatio-temporal meta information.

14. The method of claim 13, wherein, the searching the plurality of contents comprises searching for one or more second contents that was generated or reproduced at a location that is within a range of another location that the one or more first contents was generated or reproduced at based on the plurality of spatio-temporal meta information.

15. The method of claim 1, wherein, the searching the plurality of contents comprises searching for one or more second contents that was generated or reproduced at a location that is within a range of another location that the one or more first contents was generated or reproduced at based on the plurality of spatio-temporal meta information.

16. A content reproduction apparatus comprising:
    a storage unit which stores a plurality of contents;
    a control unit which receives a selection signal for selecting one or more first contents of the stored plurality of contents, searches for one or more second contents of the stored plurality of contents having spatio-temporal meta information that is within a range of spatio-temporal meta information of the selected one or more first contents, and reproduces the selected one or more first contents together with the one or more second contents found during a search,
    wherein spatio-temporal meta information of a corresponding content is information about a time and a location at which the corresponding content was generated or reproduced.

17. The apparatus of claim 16, wherein the spatio-temporal meta information comprises information regarding date, time, and location.

18. The apparatus of claim 16, wherein after finding the one or more second contents through the search, the control unit determines whether there is interference between the selected one or more first contents and the found one or more second contents, and reproduces the selected one or more first contents together with the found one or more second contents if it is determined that there is no interference between the selected one or more first contents and the found one or more second contents.

19. The apparatus of claim 16, wherein the selected one or more first contents comprise music content, and the found one or more second contents comprise picture content.

20. The apparatus of claim 19, wherein if two or more contents are found during the searching, the found two or more contents are sequentially reproduced in a slide show.

21. The apparatus of claim 16, wherein the selected one or more first contents comprise music content, and the found one or more second contents comprise text content.

22. The apparatus of claim 21, wherein if two or more contents are found during the searching, the found two or more contents are sequentially reproduced in a slide show.

23. The apparatus of claim 16, wherein the selected one or more first contents comprise picture content, and the found one or more second contents comprise music content.

24. The apparatus of claim 23, wherein if two or more contents are found during the searching, the found two or more contents are sequentially reproduced.

25. The apparatus of claim 16, wherein the selected one or more first contents comprise text content, and the found one or more second contents comprise music content.

26. The apparatus of claim 25, wherein if two or more contents are found during the searching, the found two or more contents are sequentially reproduced.

\* \* \* \* \*